Jan. 7, 1964    J. BAUDE    3,117,252
CIRCUIT BREAKER CONTROL
Filed June 23, 1959    2 Sheets-Sheet 2

Inventor
John Baude
By Carl A. Laumont Jr.
Attorney 3,117,252
CIRCUIT BREAKER CONTROL
John Baude, Milwaukee, Wis., assignor to Allis-Chalmers
Manufacturing Company, Milwaukee, Wis.
Filed June 23, 1959, Ser. No. 822,358
4 Claims. (Cl. 317—22)

This invention relates generally to circuit breaker control systems and in particular to the control system for a circuit breaker adapted to connect a distribution transformer to a network.

The control system for a circuit breaker connecting a transformer to a distribution network performs several functions. Since it is frequently necessary to disconnect the transformer from the distribution network in order to work on the distribution network, it is essential that the phases be properly related when the circuit is reclosed. In the event that the phases were inadvertently transposed the resultant current would cause a serious disturbance on the remainder of the alternating current system. Therefore, it is essential that the control circuit for the circuit breaker be designed to prevent occurrence of this situation.

Since power companies are interested in operating a distribution system at the point of maximum efficiency the circuit breaker should close to connect the distribution transformer to the network when the transformer voltage leads the network voltage and also exceeds the voltage on the network. This assures that the power flow will be in the correct direction for the most efficient distribution of electrical power. After the circuit breaker has been closed to connect the transformer to the alternating current system, the load distribution on the system may vary so that power will be flowing from the network, through the transformer, to the high voltage feeders of the transformer. When this condition prevails it is desirable to disconnect the transformer from the high voltage feeders. Should the high voltage feeders become disconnected or deenergized as a result of a fault it is desirable to disconnect the transformer from the distribution network in order to eliminate the excitation losses in the transformer.

Automatic switching may be accomplished by opening the breakers in the high voltage feeders on the primary side of the transformer. The resulting reversal of power, as the excitation current is supplied from the secondary winding, is sufficient to actuate the control system and open the circuit breaker to disconnect the secondary winding from the network. The problem becomes somewhat more complicated because reverse power sensing systems which are known in the art usually respond to a high forward current if they are sensitive to a small reverse current. To perform effectively, a reverse power sensing device must be responsive to a reverse power flow as small in magnitude as the excitation current of the transformer which results when the high voltage primary feeders are disconnected. However, the device must not respond to a forward power flow as great as the transformer may be able to deliver.

Prior art systems for controlling the circuit breaker according to the foregoing requirement have been largely mechanical in nature. For example, mechanical devices exist which will distinguish between the forward and reverse power flows. These devices are invariably expensive, difficult to adjust and require frequent maintenance if the proper operating conditions are to be maintained. They have a limited sensitivity at low power levels if they are made unresponsive to large amounts of forward power. Conversely, if they are designed to handle extremely large amounts of forward power without tripping the circuit breaker to disconnect the transformer they are generally insensitive to small amounts of reverse power such as result from the excitation current to the transformer. Mechanical devices which overcome the problem of sensitivity are invariably complicated and extremely difficult to adjust.

Similarly, mechanical devices exist which will sense the relationship of the voltages on opposite sides of the circuit breaker and can be adjusted to prevent closing of the circuit breaker when the improper phase relationship exists. These devices, like the reverse power sensing devices mentioned above, have all the difficulties attendant a mechanical device.

To overcome these difficulties, my invention provides a completely static sensing system which does away with the need for complex mechanical relays. In my device a sensing network provides a signal in phase with the system voltage and another signal in phase with the system current. Combination of these two signal voltages according to their vector sum and their vector difference produces resultant voltages which are then compared to determine the direction of power flow. This system of voltage comparison provides a positive voltage difference for a power flow in the forward direction and a negative voltage difference for a power flow in the reverse direction.

Somewhat similarly, the phase relationship and magnitude difference between voltages on the opposite sides of the circuit breaker is established. The same voltage sensing means as was used with the power sensing circuit is used to sense a voltage on one side of the breaker and a similar sensing means is used to detect the voltage on the transformer side of the breaker. A comparison is then made between the voltage on the distribution side of the breaker and a voltage responsive to, but shifted in phase from, the difference in voltage between the two sides of the breaker. These two voltages are combined vectorially to provide the vector sum and the vector difference of the voltage on the distribution side of the breaker and the phase shifted difference between the two voltages. In this manner a signal voltage is derived which varies in polarity according to whether the voltage on the transformer side of the breaker is leading or lagging the voltage on the network side of the breaker. Since it is also desired to establish the relative magnitudes of the two voltages an additional circuit is used wherein the voltage on the network side of the breaker and the difference in voltage between the two circuits are combined vectorially. The output signal of this portion of the circuit is responsive to the difference between the vector sum and the vector difference of the voltage on the network side of the breaker and the difference in voltage between the two systems. These two signal voltages are then used to control series connected switches to the closing control for the circuit breaker. In effect, the closing control will not operate until both switches have closed indicating that the voltage on the transformer side of the breaker exceeds the voltage on the network side and also that the proper phase relationship between the two voltages exists.

It is an object of my invention to provide a static device for the control of a circuit breaker connecting a transformer to a distribution network.

It is another object of my invention to provide a static control device for the control of a circuit breaker which prevents closing of the circuit breaker when the improper phase relationship exists on opposite sides of the breaker and which opens the breaker in response to a flow of power in the reverse direction.

It is a further object of my invention to provide a control system for circuit breaker which is easily maintained, small in size, and which has no moving parts.

A further object of this invention is to provide a control system for a circuit breaker which is relatively insensitive to harmonic voltages.

Other objects and advantages will be apparent from a consideration of the following description taken in connection with the accompanying drawings, in which.

Figure 1:
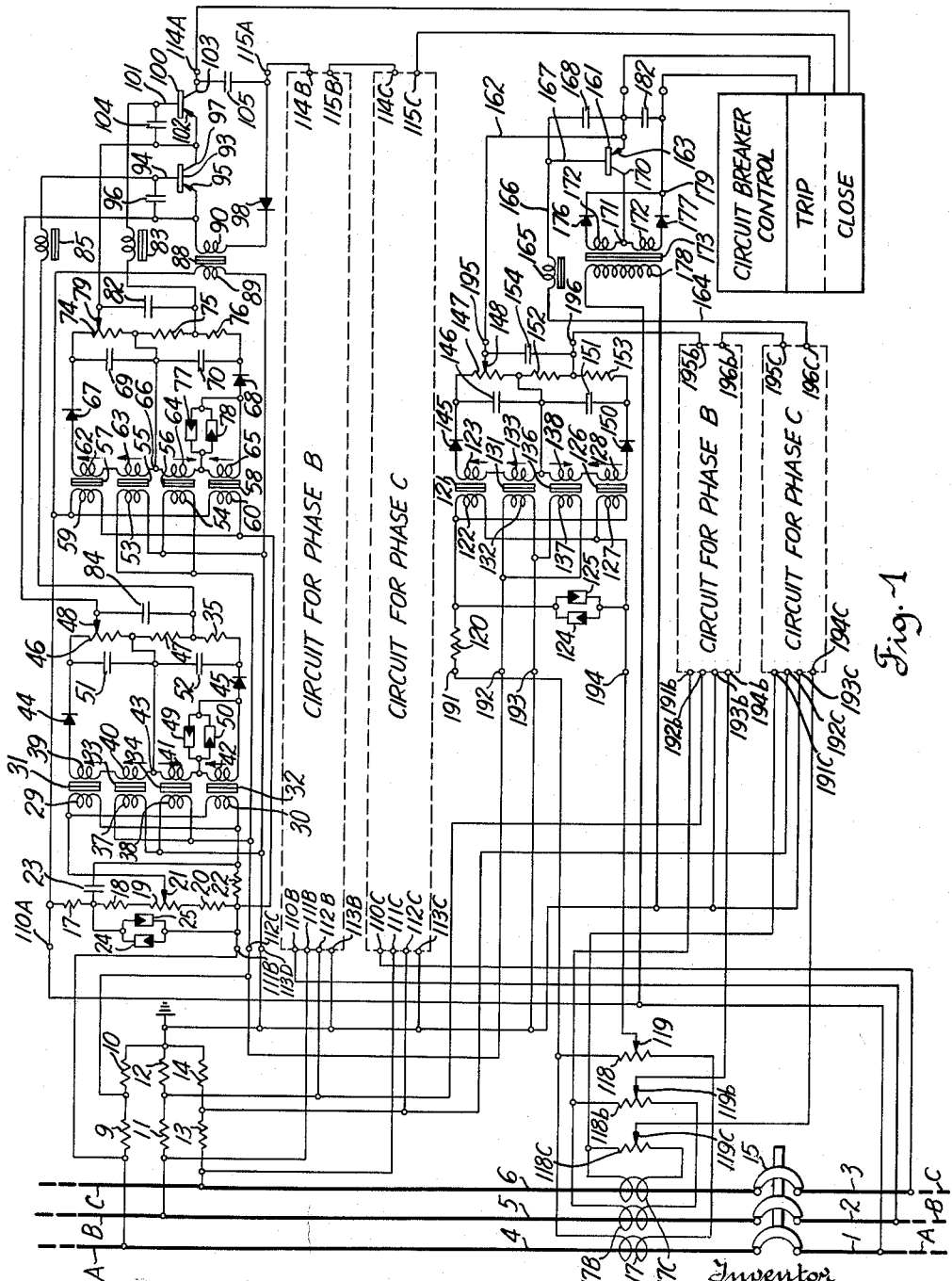
FIG. 1 is a schematic drawing of a circuit breaker control system embodying my invention.

Referring to FIG. 1 of the drawing, a three phase circuit A, B and C, comprising conductors 1, 2 and 3, is fed from a transformer, not shown, and connected by a circuit breaker 15 to a network distribution system through conductors 4, 5 and 6. The network distribution system will be understood to have a plurality of similar feedpoints at various locations throughout the system. Potential dividing resistors 9 and 10 are connected to give a measure of the phase A to neutral voltage and in conjunction with resistors 11 and 12 for phase B and resistors 13 and 14 for phase C comprise means for sensing the circuit voltage. Thus, the voltage across resistor 10 represents a portion of the phase to neutral voltage of phase A of the network. The series resistors 17, 18, 19 and 20 are energized by the difference in voltage between the network side and the transformer side of the circuit breaker 15. This difference will be referred to as the phasing voltage. Limiting means such as a pair of varistors 24 and 25 prevents the phasing voltage across the resistors 18, 19 and 20 from exceeding a predetermined amount by causing a varying IR drop across resistor 17. This prevents overloading portions of the circuit when the voltage difference across the breaker is great. A possible overload condition exists when the network is not energized and the voltage exists only on the transformer side of the breaker.

A resistor 22 and capacitor 23 coact with resistors 18, 19 and 20 to form a phase shift circuit. The output of this circuit, taken between the variable tap 21 on resistor 19, and the junction between resistor 22 and capacitor 23, is phase shifted approximately 90 degrees from the phasing voltage appearing across the varistors 24 and 25. The variable tap 21 on resistor 19 allows a variation of the phase shift which takes place and therefore permits adaptation of the circuit to various network systems which require different methods of operation due to the type of loading.

The output of the phase shift circuit which is the phase shifted phasing voltage is connected to the primary windings 29 and 30 of transformers 31 and 32. The transformers 33 and 34 have their primary windings 37 and 38 energized by the measure of the phase A to neutral voltage which appears across resistor 10. The four transformers 31, 32, 33 and 34 have their secondary windings 39, 40, 41 and 42 connected in a center tapped series circuit to feed a pair of half wave rectifiers 44 and 45. Windings 39 and 40 feed rectifier 44 and windings 41 and 42 feed rectifier 45. The direct current output of rectifiers 44 and 45 appears across resistors 35, 46 and 47. Capacitors 51 and 52 connected from the output side of the rectifier to the center tap 43, provide a filtering action on the pulsating direct current output of the rectifier.

Figure 2:
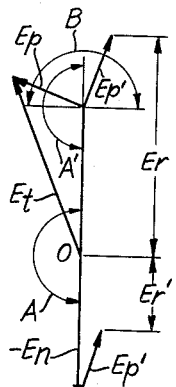
FIG. 2 is a vector diagram illustrating the relationship between transformer voltage and the network voltage which permits the circuit breaker to close.

The connection of the four transformers 31, 32 and 33 and 34 is best explained with reference to FIG. 2. Vector $E_n$, representing the voltage to neutral of one phase of the network, appears across resistor 10. $E_t$ represents the voltage to neutral of the same phase on the transformer side of the breaker 15. It will be seen from FIG. 1 that the phase shift circuit and the series resistor 17 are energized by the phasing voltage which is the difference between the voltage on the transformer side of the breaker and the voltage on the network side. In FIG. 2 this voltage is shown as $E_p$.

In FIG. 2, the transformer voltage has been represented as slightly leading the network voltage. This will be the usual case. However, it is also possible that the reverse condition will exist and the transformer voltage will lag the network voltage. It may also be that the two voltages are identical such as the condition when the circuit breaker is closed.

The phase shift circuit rotates vector $E_p$ approximately 90 degrees, depending on the setting of tap 21 on variable resistor 19 to produce a voltage $E_p'$ as shown in FIG. 2.

It is this voltage $E_p'$ which energizes the primary windings 29 and 30 of the transformers 31 and 32. The other transformers 33 and 34 have their primary windings 37 and 38 energized by a measure of the phase A to neutral network voltage $E_n$ which appears across resistor 10. The secondary windings 39 and 40 of the transformers 31 and 33 are series connected so that the vector sum of $E_n$ and $E_p'$ appears across the extremities of the two windings 39 and 40 between rectifier 44 and center tap 43. Arrows in FIG. 1 indicate the polarity of the transformer connections.

Secondary windings 41 and 42 of the other two transformers 32 and 34 are connected so that the vector difference between the $E_n$ and $E_p'$ appears across the extremities of the windings between rectifier 45 and center tap 43. Thus, rectifier 45 is energized with the vector resultant of $E_p'-E_n$ and rectifier 44 is energized with the vector resultant of $E_p'+E_n$. The direct current output voltage from rectifier 44 will be essentially the peak value of $E_p'+E_n$ and is shown as $E_r$. Since capacitor 51 charges to this value it is a relatively high impedance of the load circuit. Similarly, the direct current output voltage from rectifier 45, which is shown as $E_r'$, will charge capacitor 52 to essentially the peak value of $E_p'-E_n$ for the same reason. However, the varistors 49 and 50 across the secondary winding 42 of the transformer 32 limit the voltage across this winding.

In normal operation, the difference in voltage, $E_p$, between the network and the transformer will be relatively small. When the network is energized the network voltage would be substantially the same as the transformer voltage. In the event the network voltage $E_n$ is zero, it will be seen that the value of $E_p$ will be equal to $E_t$. The transformers 31 and 32 will receive equal voltage to the primary windings 29 and 30 since these windings are connected in parallel and are both energized by $E_p'$. There is no voltage across the primary windings 37 and 38 of transformers 33 and 34 when their network voltage is zero.

This condition would normally result in zero output voltage across the load resistor 47 and the tapped portion of resistor 46, since the rectifiers 44 and 45 are connected in opposition and the tap divides resistor 46 in the same ratio as the values of resistance of resistors 37 and 47. However, varistors 49 and 50 across the secondary winding 42 of the transformer 32 limit the maximum voltage which may appear across this winding to a value above that produced for the normal values of $E_n$ but below that which is induced when the network voltage is zero.

The phasing voltage has to be far above normal values to have this limitation take effect so limiting occurs only during the period when the network voltage is zero or very nearly so. Assuming that the phasing voltage does become quite high, it is first limited by the varistors 24 and 25. This is to avoid overloading the phase shift circuit. The phase shifted output is then fed to primary windings 29 and 30 of the transformers 31 and 32. The varistors 49 and 50 across the secondary winding 42 of the transformer 32 limits the voltage which feeds the rectifier 45. There is no such limitation on the voltage across the secondary winding 39 of transformer 31 which feeds rectifier 44. Therefore, providing the voltage across each of the secondary windings 39 and 42 exceeds the value at which the limiting effect of varistors 49 and 50 takes place, the rectified output of rectifier 44 will exceed the output of rectifier 45 and a positive output voltage will be attained across the resistor 47 and a portion of resistor 46 included by the variable tap 48. This variable tap provides an adjustment to locate the point at which the output of rectifier 44 balances the output of rectifier 45 for a given input.

Looking once again at FIG. 2, it will be observed that the peak value of $E_r$, which represents the peak or rectified value of the vector sum of $E_p'+E_n$, will always be greater than $E_r'$ which represents the peak or rectified value of the vector difference of $E_p'-E_n'$, as long as the vector $E_p$ is within the angle designated A. This is true since $E_p$ must lie within the angle A'; therefore, $E_p'$, which is shifted 90 degrees from $E_p$ lies somewhere above the terminal point of $E_n$ within the angle B and must increase the peak value of $E_r$ over $E_n$ and decrease the peak value of $E_r'$ under $-E_n$. The direct current output voltage of the rectifier 44 will exceed the direct current output voltage of the rectifier 45 and the positive output voltage will be obtained across resistor 47 in the tapped portion of resistor 46.

Summarizing in another manner, as long as the vector $E_p$, representing the voltage input to the phase shift circuits, lies to the left of the boundary along $E_n$, the output $E_p'$ of this circuit will be a vector above a boundary line passing through the tip of $E_n$. This follows since the amount of phase shift is 90 degrees. It will be remembered that the phase shift circuit is adjustable to obtain a variable amount of phase shift so that the input to the phase shift circuit could be anywhere to the left of the boundary line that may be rotated about the tip of $E_n$ to the left or right of the vertical. If the boundary line were so rotated, by changing the tap 21 to vary the phase shift obtained, the input to the phase shift circuit would still produce a positive output voltage across resistors 35, 46 and 47 even though the transformer voltage lags the network voltage.

Figure 3:
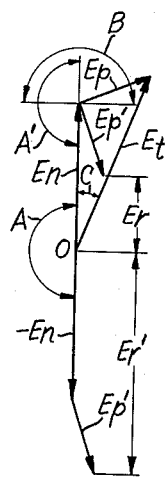
FIG. 3 is a vector diagram illustrating the vector relationship between the transformer voltage and the network voltage which does not permit the circuit breaker to close.

The discussion thus far has covered only the case where the transformer voltage lies within the area which allows the breaker to close. In the event the transformer voltage lags the network voltage by a significant amount the breaker should remain open. This condition is shown in FIG. 3.

The transformer voltage may be seen to lag the network voltage by the angle C. $F_p$ lies outside of the limit shown by angle A' in FIG. 2 and $E_p'$ is outside the angle B. Therefore, $E_p'$ subtracts from the peak value of $E_n$. The peak value of $E_p'-E_n$, $E_r'$, exceeds the peak value of $E_p'+E_n$ which is $E_r$. This means that the peak alternating voltage input to rectifier 44 will be less than the peak alternating voltage input to rectifier 45 and the direct current output voltage across resistors 46 and 47 will be of a negative polarity. In the foregoing manner, the positive output voltage is obtained when the network voltage $E_n$ lags behind the transformer voltage $E_t$, thereby establishing a boundary for $E_t$ which passes through $E_n$. There is also the condition that the inphase component of $E_t$ should exceed $E_n$ so a second portion of the circuit establishes a boundary which passes through the tip of $E_n$ and is perpendicular to $E_n$.

The voltage across resistor 10 energizes primary windings 53 and 54 of the two transformers 55 and 56 giving them a measure of the voltage of phase A to neutral. The primary windings 53 and 54 of transformers 55 and 56 are connected in parallel so that each transformer receives a measure of the phase A to neutral voltage. In a similar manner, the transformers 57 and 58 have their primary windings 59 and 60 connected in parallel so that each receives a measure of the phasing voltage $E_p$ which appears across resistors 17, 18, 19 and 20.

Figure 4:
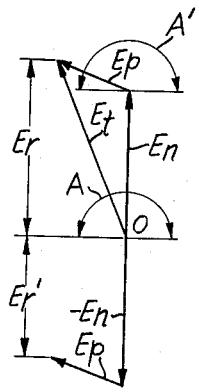
FIG. 4 is a schematic vector diagram illustrating the relationship between the transformer voltage and the network voltage which permits the circuit breaker to close.

In FIG. 4 the voltage energizing the primary windings 53 and 54 of transformers 55 and 56 is indicated by the vector $E_n$. The other transformers 57 and 58 in the combination of four have their primary windings 59 and 60 connected in parallel and are energized by the phasing voltage which is the difference between $E_n$ and $E_t$. In the vector diagram of FIG. 4 this voltage is indicated as $E_p$. The windings are so combined to produce across the series connected secondaries 62 and 63 the vector sum of $E_p+E_n$. The output of rectifier 67 is represented by $E_r$.

Rectifier 68 is energized by the voltage across series connected secondaries 64 and 65. The output of rectifier 68 is represented as $E_r'$ in FIG. 4 and has the peak value of the vector difference between $E_t$ and $E_n$. The output of the half wave rectifiers 67 and 68 is the pulsating direct current. Filter capacitors 69 and 70 connected from the output of the rectifiers to the center tap 66 have been added. The filter capacitors rapidly charge to the peak value of the pulsating direct current and remain substantially at that point between cycles. Resistor 74 is connected from the output of rectifier 67 to center tap 66 and resistors 75 and 76 are connected from the output of rectifier 68 to center tap 66.

With reference to FIG. 4 it is easily seen that the peak value of $E_r$ will always be greater than $E_r'$ as long as the vector $E_t$ is within the angle A so the inphase component of $E_p$ adds to the value of $E_n$. Putting it another way, the peak value of $E_r$ will be greater than $E_r'$ when the vector $E_p$, the phasing voltage, lies within the angle A'. When $E_p$ increases the value of $E_r$ over $E_n$ the condition exists whereby $E_r$ is greater than $E_r'$.

Figure 5:
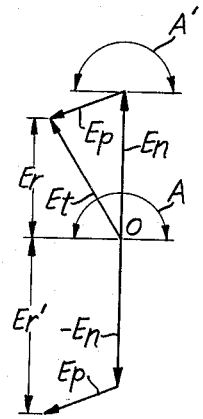
FIG. 5 is a schematic vector diagram illustrating the vector relationship between the transformer voltage and the network voltage which does not permit the circuit breaker to close.

FIG. 5 shows the condition when $E_t$ has the proper phase relationship to $E_n$ but is improperly related in magnitude. This case shows the inphase component of $E_p$ subtracting from $E_n$ and adding to $-E_n$ so that $E_r'$ exceeds $E_r$.

The portion of the circuit described thus far defines two boundary conditions for the vector representing the transformer voltage, first being that the transformer voltage must be leading the network voltage and the second being that the inphase component of the transformer voltage must exceed the peak value of the network voltage. Another way of saying this is that the vector representing the transformer voltage must terminate within the area defined by the radii of the second quadrant of a circle having its center at the tip of vector $E_n$.

Standard network requirements require that the circuit breaker be closed when the network voltage is zero. When the voltage on the network side drops to zero, primary windings 53 and 54 of transformers 55 and 56 will not receive any current because the voltage across resistor 10 is zero. That is to say, the voltage across the primary windings 53 and 54 will be zero. Since the other two transformers 57 and 58 have their primary windings 59 and 60 energized in parallel, the voltages appearing across the secondary on each side of the center tap 66 will be equal and therefore the voltage across resistor 74 will equal that across resistors 75 and 76, producing no output across resistor 75 and the portion of resistor 74 included by tap 79. Since a positive output voltage must be obtained from this circuit if the circuit breaker is to be closed, it is necessary to devise some means for providing this output when the network voltage is zero. This is done by means of the varistors 77 and 78 connected across the secondary winding 65 of transformer 58 to limit the voltage in the same manner as with winding 42 and transformer 32. When the phasing voltage $E_p$ becomes quite large, the voltage across the secondary windings 62 and 65 of the transformers 57 and 58 will also become quite large, and exceeds the point at which the limiting effect of varistors 77 and 78 takes place. This means that the total voltage across the windings 64 and 65 on the lower side of the center tap will be substantially smaller than the total voltage across the windings 62 and 63 on the upper side of the center tap due to the limiting effect of the varistors. The direct current output produced by rectifier 67 will therefore be greater than the direct current output produced by rectifier 68. Since these two direct current outputs are connected in opposition, it follows that the output across resistor 75 to variable tap 79 on resistor 74 will also be of a positive nature. This pulsating direct current is filtered by capacitors 69 and 70. Since additional filtering may be necessary the filter capacitor 82 and choke 83 are used. Similarly, the first transformer combination has its output filtered by means of a filter capacitor 84 and a choke 85.

A power transformer 88 has its primary winding 89 energized by the phase to neutral voltage on the transformer side of the circuit breaker. This insures that transformer will receive energy at all times when it is desired to close the circuit breaker. A secondary winding 90 of this transformer is connected to an output circuit through a series of transistor switches.

The first transistor 93 of the PNP junction type has its base 94 connected to the junction of resistor 35 and resistor 47 through an impedance in the form of filter choke 85. Emitter 95 of transistor 93 has a connection leading to the secondary winding 90 of power transformer 88. Another lead runs from the emitter 95 to the variable tap 48 on resistor 46. Connected between emitter 95 and base 94 is a capacitor 96 which provides a filtering action and also coacts with impedance 85 to provide a time delay to the switching action.

It is a property of the PNP junction transistor that the emitter to collector resistance is very high when base 94 is biased negatively with respect to the emitter. Resistance in the reverse, or collector to emitter direction, is low under this condition. To avoid the necessity for two transistors in each switch a diode 98 is included in the circuit to block the reverse cycle of alternating current. If it were not for this diode the reversal of polarity in the voltage across winding 90 would result in conduction through the transistor in the reverse direction and complete cutoff of collector-emitter current would be impossible.

A similar PNP junction transistor 100 has the base 101 connected to the point common to resistors 75 and 76 and emitter 102 connected to variable tap 79 on resistor 74. Emitter 102 and collector 103 are in series with the circuit to be controlled. A capacitor 104 connected between the emitter 102 and base 101 provide the filtering action on the control voltage and coacts with impedance 83 to produce a time delay. Although capacitor 104 is not essential to successful operation of the device, it appears that the condition of the capacitor greatly improves the action of the switch. The reason for such improvement is not entirely clear and may be related to the fact that the transistors are not used as amplifiers in the ordinary sense but are either in the conducting state or nonconducting state. This mode of operation greatly increases the current rating of the transistors since there is very little energy dissipated within the transistor itself.

Each switch is responsive to the position of the vector $E_t$ with respect to a specific boundary. The boundaries define an area in which the vector $E_n$ must terminate if both switches are to be closed. In the case of the first transistor switch, conduction through the switch of a pulsating direct current will take place when as shown in FIG. 2, $E_r$ is greater than $E_r'$ causing the emitter to divide positively with respect to the base. In a similar manner, conduction to the second transistor of a pulsating direct current when, as shown in FIG. 4, $E_r$ is greater than $E_r'$ causing the emitter to be biased positively with respect to the base. A filter capacitor 105 connected across the output of transistor switch circuit and a power transformer serves to filter the pulsating direct current.

It will be observed that this description relates to a three phase circuit and only one phase has been thoroughly described. A portion of the circuit described in the foregoing is connected to the network at terminals 110A, 111A, 112A and 113A. Connection to the circuit breaker control is made at 114A and 115A. The circuits in the dotted enclosures represented by B and C are identical to that described with reference to A.

Since the only difference between the three circuits is the point of connection to the network on the transformer side of the circuit, only the phase A portion has been described in detail.

Each of the protective circuits has its connection to its respective phase conductor. For example, resistors 11 and 12 measure phase B with the voltage across resistor 12 as a measure of the phase B to neutral voltage. Resistors 13 and 14 measure phase C with the voltage across resistor 14 as a measure of the phase C to neutral voltage. The connections for the phasing voltage for phase B are made between conductors 2 and 5. In a similar manner, the phasing voltage for phase C is measured between conductors 3 and 6.

The outputs of the respective phase protective circuits may be connected in series with the circuit breaker closing circuit, in which case the breaker will not close unless the proper closing conditions are met on all three phases. The outputs may be connected in a parallel circuit relationship with each other whereby closing condition for any one phase wil permit closing of the circuit breaker. In the embodiment shown and described the outputs of the three circuits are in series with the closing circuits so that a satisfactory closing condition must be had in all three phases in order to close the breaker.

Since it is necessary to have the circuit breaker operate to disconnect the distribution network from the transformer in the event of a reverse flow of power, the portion of the control system is devoted to sensing a reverse flow of power in the conductors 4, 5 and 6. A current transformer 117 inductively related to conductor 4 to provide a voltage across the resistor 118 responsive in phase and magnitude to the current in conductor 4. A variable tap 119 on the resistor 118 picks off a signal voltage which is directly responsive to the current flowing in conductor 4. The signal voltage is fed through resistor 120 to the primary windings 122 and 127 of transformers 121 and 126. Varistors 124 and 125 in parallel with the primary windings 122 and 127 create a varying voltage drop across the series resistor and thereby prevent excessive current in the primary windings which would otherwise result when a large signal appears across the tapped portion of resistor 118. The varistors 124 and 125 could be a double anode zener diode as well.

It is desirable to so limit the current applied to the primary windings 122 and 127 to avoid the problem of overloading any portion of the circuit. The use of miniature components is made possible by operating the control circuit at very low power levels. However, components of a small size must be carefully protected against overloading due to their very limited capacity to handle overloads. This is especially true of the transformers because excessive primary current may saturate the core during a portion of the voltage cycle which saturation leads to the generation of harmonics and other detrimental effects. For these reasons it has been found desirable to include some kind of voltage limiter in the first stages of control circuit.

Transformers 131 and 136, having primary windings 132 and 137, are energized by the voltage appearing across the portion of the voltage divider network 140 made up of resistors 141 and 142. The transformers 131 and 136 having primary windings 132 and 137 are energized by the voltage appearing across a portion of the voltage divider network made up of resistors 9 and 10. The voltage across resistor 10 is proportional, in phase and magnitude, to the potential of conductor 4 relative to ground. The voltage signal taken across resistor 10 energizes primary windings 132 and 137 of transformers 131 and 136.

It is not absolutely necessary to provide protection against overloading components in this part of the circuit, since the voltage on the system will not vary as widely as the current and the circuit may be easily designed to operate over the entire range of possible variation.

The series connection of the secondary windings 123 and 133 provide the vector sum for the voltages across these windings. The voltage input to the half wave rectifier 145 will be a voltage proportional to the vector sum of a first alternating voltage, developed across the tapped portion of resistor 118 and responsive to the system current and a second voltage, developed across resistor 10 and responsive to the system voltage. The output of rectifier 145 is filtered by means of capacitor 146 in parallel with the load resistor 147. The direct current output of rectifier 145 produces a direct voltage across resistor 147 which is proportional to the peak value of the vector sum of the voltages across the windings 123 and 133. A portion of this voltage is picked off by means of a variable tap 148.

Contrary to the windings 123 and 133 which energize rectifier 145 with the vector sum of the voltages across the windings, secondary windings 128 and 138 feeding rectifier 150 are polarized to produce the vector difference between the voltages across primary windings 127 and 137. It will be remembered at this point that the voltage across windings 122 and 127 is responsive to the system current and the voltage across windings 132 and 137 is responsive to the system voltage. This means that the input to rectifier 145 is the vector sum of the voltages responsive to system voltage in current and the input to rectifier 50 is the vector difference to voltages responsive to system voltage in current. Rectifier 145 and rectifier 150 have capacitors 146 and 151 connected across their output circuits so the D.C. output voltage from the rectifiers will be essentially the peak value of the alternating voltages across the extremities of windings 123 and 133 and windings 128 and 138. Resistors 152 and 153 constitute the load circuit for rectifier 150. The series resistance of resistors 152 and 153 is approximately the same as the value of resistor 147. Tapping the load of rectifier 150 at the junction of resistors 152 and 153 insures that the adjustment permitted by tap 148 will be sufficient to compensate for any unbalance in the components feeding the rectifiers. Instead of the resistors 152 and 153, a single resistor with a tap might also be used.

The direct current output voltage across the tapped portion of the rectifier load resistors 147 and 152 is essentially the voltage difference between the input to rectifier 150 and rectifier 145. For example, if the output of rectifier 145 exceeds the output of rectifier 150, the potential at tap 148 will be more positive than the potential at the junction of resistors 152 and 153, assuming that the components are balanced and the tap divides resistor 147 in the same ratio as resistors 153 to 152. The balance adjustment which is tap 148, also makes it possible to vary the response of the overall system.

Between tap 148 and the junctions of resistors 152 and 153 is connected a capacitor 154 which charges to the value of the potential difference between the tap and the junction. This potential difference may be considered the output voltage of the sensing circuit associated with the conductor 4.

The circuit for sensing reverse power in conductor 4 or phase A is connected to the alternating current circuit at terminals 191, 192, 193 and 194. The output of this circuit appears across the terminals 195 and 196. Since it is desirable to measure the reverse power in all three phases or conductors additional circuits are included in this control system for sensing the reverse power in phases B and C. The circuit for phase B and the circuit for phase C are identical in all respects to that for phase A. Since it would be repetitious to go through the description in detail the circuit for phase B is shown in the dotted block as having connections 191B, 192B, 193B and 194B to the alternating current system and the output for the circuit of phase B appears across the terminals 195B and 196B. The internal connection and circuit components are the same as was described with reference to phase A.

Similarly, the circuit for sensing reverse power in phase C is shown in block form. This circuit is connected to the alternating current system at terminals 191C, 192C, 193C and 194C. The output for this circuit appears across terminals 195C and 196C.

As was the case with phase A, the circuit for phase B has the output of the current transformer 117B connected between terminals 191B and 194B. The voltage signal for phase B is derived from the voltage across resistor 12 in the same manner as for phase A. This input is connected between terminals 192B and 193B. Phase C is similarly connected to the alternating current circuit in that the output of current transformer 117C appears across resistor 118C and is tapped off at 119C to appear across terminals 191C and 194C. The voltage signal for phase C is derived from the voltage appearing across resistor 14 and appears across the input terminals 192C and 193C.

Since it is the net power of the circuit with which we are concerned the outputs of the three sensing circuits are connected in series. This means that an extremely high reverse power in any one phase might be sufficient to cause the net power flow to be in the reverse direction and this would result in tripping of the circuit breaker. Tap 148 on resistor 147 allows the amount of reverse power to be adjusted. In other words, if the control system is connected to a circuit in which one phase can be expected to have an unusually high amount of reverse power in normal operation the tap may be adjusted to prevent tripping of the circuit breaker when this condition occurs. The system could be connected with the outputs connected in parallel whereby a reverse power in any one conductor regardless of the amount would be sufficient to cause the circuit breaker to trip.

To summarize the operation of the series summing circuit assume that the magnitude of each of the individual output voltages is proportional to the power flow in its respective conductor. The sum of the three output voltages will then be proportional to the total power flow to the circuit represented by the three conductors. Since the polarity of the individual output voltages is responsive to the direction of power flow in its particular conductor, the polarity of the resultant output voltage will be responsive to the direction of the net power flow. That is to say, reverse power flow through any one conductor need not change the polarity of the output voltage and trip the circuit breaker unless the magnitude of the reverse power flow is such that it overshadows the forward power flow of the other two conductors. The capacitor 154 across the output of the reverse power sensing circuit aids greatly in providing a direct current output for the three circuits which is proportional to the algebraic sum of the output voltages of the respective sensing circuits. The resultant combined output voltage is conducted to the emitter-base circuit of transistor 161. Conductor 162 leads to the emitter 163 of transistor 161. Conductor 164 leads from the terminal 196C to the choke 165. Conductor 166 leads from choke 165 to base 167 of transistor 161. When the polarity of the voltage between terminals 196C and 195 is such that terminal 195 is more positive than terminal 196C, the emitter 163 of the transistor 161 will be biased positively with respect to base 167. This bias condition prevents current from flowing through the emitter-collector circuit. A capacitor 168 is connected between emitter 163 and base 167 to improve the control characteristics of the transistor and bypass any harmonics which may be present in the control voltage. The collector 170 of transistor 161 is connected to center tap 171 of the secondary winding 172 of power transformer 173. The extremities of the secondary windings 172 are connected to rectifiers 176 and 177. The primary winding 178 of transformer 173 is connected to be energized by the voltage drop between conductor 1 and ground. This is merely a convenient method of obtaining the power required to energize this transformer and could be replaced with any suitable alternating current source.

Rectifiers 176 and 177 coact to provide a direct current voltage between terminal 171 and terminal 179. Conductor 180 leads from terminal 179 to one input terminal of the circuit breaker control system associated with the trip coil. Conductor 181 leads from the other side of the circuit breaker control system associated with the trip coil to emitter 163 of the transistor 161. Capacitor 182, connected across the output circuit serves to filter the pulsating direct current output of rectifiers 176 and 177. Emitter 163 and collector 170 of transistor 161 are in series circuit with the direct current output between terminals 171 and 179 and the input to the circuit breaker control associated with the trip coil. When emitter 163 is more positive than base 167 no current will flow in the emitter-collector circuit. This means that no signal is presented to the circuit breaker trip coil control. When the base of the transistor becomes more positive than the emitter, transistor will conduct between the emitter and collector. This allows the signal to be presented to the trip coil of the circuit breaker control system.

Figure 6:
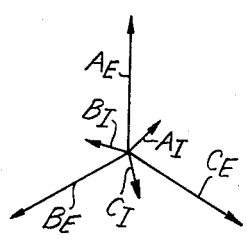
FIG. 6 is a vector diagram indicating the relationship between current and voltage during the condition of forward power flow.

Since various networks may be operated in different manners, according to different standards, a circuit breaker control system must be devised which is capable of accommodating the various conditions under wich it may be desirable to operate the network. For example, it might be desirable to disconnect the system from the transformer when a very slight amount of reverse power flow in one distribution system to allow remote switching of the circuit breaker. On the other hand, it might be undesirable to trip the breaker in another system unless exceedingly large amounts of reverse power flow. To accommodate the wide variety of conditions that are to be encountered in the wide variety of distribution systems now in use, certain adjustments have been provided in my invention to allow the circuit to trip the circuit breaker at various amounts of forward or reverse power flow. FIG. 6 is a vector diagram representing the relationship of current and voltage on the three conductors. Vectors 193, 194 and 195 represent the current flowing in these three conductors. This vector diagram represents a forward power flow on the alternating current system.

Figure 7:
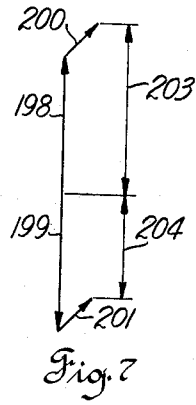
FIG. 7 is a vector diagram illustrating the relationship of the two output voltages present in the circuit of FIG. 1 during the condition of forward power flow.

The relationship of the voltages developed across secondary windings 123, 133, 138 and 128 of transformers 121, 131, 136 and 126, respectively, for the forward power condition shown in FIG. 5 are illustrated in FIGS. 6 and 7, respectively. In FIG. 6 vectors $A_E$, $B_E$ and $C_E$ represent the voltage of the respective phases and vectors $A_I$, $B_I$ and $C_I$ represent the current in conductors 4, 5 and 6, respectively. Vector 198 in FIG. 7, represents a voltage across secondary winding 133 of transformer 131. Vector 199 represents the voltage across secondary winding 138 of transformer 136. These two voltages represented by vectors 198 and 199 are of the same polarity with respect to the center tap of the transformer. In other words, when one increases, the corresponding increase occurs on the other side of the center tap so that the input to rectifier 145 is compensated for by a change in the input to rectifier 150. Vector 200 represents the voltage across secondary winding 123 of transformer 121, and vector 201 represents the voltage across winding 128 of transformer 126. The peak value of the voltage across the extremities of the windings 123 and 133 is represented by the arrow 203 and in a similar manner, the peak value of the voltage across the extremities of windings 128 and 138 is represented by the arrow 204. For the phase relationship portrayed in FIG. 6, it will be observed that the vector 200 adds to the vector 198 in FIG. 7 to increase the peak value of arrow 203. The vector 201 subtracts from vector 199 to decrease the peak value of arrow 204. This means that the total input voltage to rectifier 145, which is the peak value of the vector sum of vectors 198 and 200, will exceed the input voltage to rectifier 150, which is the peak value of the vector sum of vectors 199 and 201. The arrow 203 is proportional to the voltage output of rectifier 145 and the arrow 204 is proportional to the voltage output of rectifier 150. The capacitors 146 and 151 charge the peak value of the voltage output of their respective rectifiers.

Since the output of rectifiers 145 exceeds the output of rectifier 150 during the condition of forward power flow, tap 48 is at a higher positive potential than the junction of resistors 152 and 153. This biases emitter 163 positive with respect to base 167 and prevents current flow between the emitter and collector. With transistor switch 161 cut off, no current flows through the circuit and the circuit breaker trip coil control is deenergized.

Figure 8:
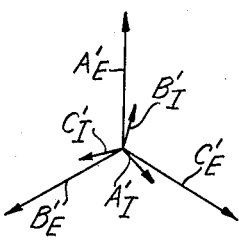
FIG. 8 is a vector diagram illustrating the relationship between the current and voltage in the circuit shown in FIG. 1 during the condition of reverse power flow.

The voltage relationship for the reverse power flow on the alternating current circuit is shown in FIG. 8. Vectors $A_E'$, $B_E'$ and $C_E'$ represent the voltage on conductors 4, 5 and 6, respectively. The current in conductors 4, 5, and 6 is represented by vectors $A_I'$, $B_I'$ and $C_I'$, respectively.

The effect of the current voltage relationship illustrated in FIG. 8 on the output of the sensing circuit is explained with reference to FIG. 9, which shows the voltages developed in one of the sensing circuits. The other two sensing circuits function in the same manner so they may be understood from an explanation of the circuit associated with conductor 4.

Vector 218 represents the voltage developed across the secondary windings 133 and 138 of transformers 131 and 136. The phase and magnitude of the vector are responsive to the voltage of conductor 4. Secondary windings 128 and 138 are polarized oppositely with respect to the current signal voltage which energizes primary windings 122 and 127. The signal voltage which causes a positive voltage relative to the center tap, across winding 123, produces a negative voltage across winding 128. In other words, a current signal which tends to increase positive potential at the junction of rectifier 145 and winding 123 tends to reduce the positive potential of the junction of rectifier 150 and winding 128, other things remaining equal. The reverse polarity of winding 128 is important since it allows the phase relationship between the current and voltage on the conductor to be determined. As long as vector 220, which is the voltage across winding 123, lies within the angle defined by the arc 227, the peak value of the voltage across windings 123 and 133, represented by arrow 224, will be less than the voltage across winding 123.

In contrast to the situation where the peak value of the combined voltage is reduced by the current responsive signal, the windings 128 and 138 presents a situation where the current signal increases the peak value of the voltage across the windings. Vector 221 representing the voltage across the winding 128 will add to the peak value of vector 229, the voltage across winding 138, with the phase angle of vector 221 lies within the boundary of arc 228.

Stating it another way, when the phase relationship of the current in voltages is such that the vector 220 increases the peak value of arrow 224 of the combination of vectors 218 and 220, then the input to rectifier 145, which is represented by arrow 224, will predominate over the input to rectifier 150. This is shown in FIG. 7. Conversely, when vector 220 decreases the peak value of the sum of the vectors 218 and 220 then the input to rectifier 150 will predominate over the input to rectifier 145.

Normally the current in voltage will be in the relationship shown in FIG. 5 and FIG. 6 since this represents forward power flow. In this case vector 209 increases the peak value of arrow 203 over the value of vector 198.

Figure 9:
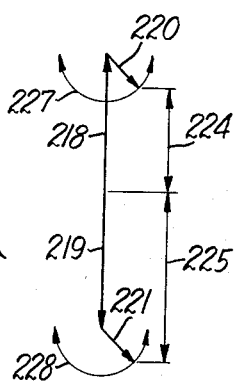
FIG. 9 is a vector diagram illustrating the relationship of the two output voltages present in the circuit of FIG. 1, for the reverse power flow condition.

For reverse power flow in relationship shown in FIGS. 8 and 9 is typical. The current vector has shifted in phase so it increases the peak value of arrow 225 over the peak value of vector 219.

The input to rectifier 145 is the vector resultant of the voltages across secondary windings 123 and 133. This A.C. voltage is converted to D.C. which charges capacitor 146. The D.C. voltage across this capacitor will be essentially equal to the peak value of the A.C. input to the rectifier. Presence of the load resistor 47 across the capacitor prevents the charge from remaining at peak value. However, when the resistance is made sufficiently large, time constant of the resistor capacitor combination is so great that the charge remains essentially at the peak value throughout the voltage cycle. Capacitor 151, connected to be energized by the output of rectifier 150, is charged to the peak value of the A.C. voltage across secondary windings 128 and 138.

In FIGS. 7 and 9, the input to the rectifiers is shown vectorially and the output represented by the arrows 203, 204, 224 and 225. The output voltage is developed by rectifier 145 across resistor 147 and is represented by arrows 203 and 224. The output voltage developed by rectifier 150 across resistors 152 and 153 is represented by the arrows 204 and 225.

Resistors 152 and 153 divide the load of rectifier 150 into a fixed ratio. The variable tap 148 on resistor 147 allows the load of rectifier 145 to be divided into a variety of ratios. Assume the ratio of resistor 152:153 is 3:1. When tap 148 divides resistor 147 by the same ratio, and equal output voltages are produced by the rectifier, there will be no voltage output between the tap 148 and the junction of resistors 152 and 153. However, assume the same equal output voltages for the rectifiers but the tap 148 has been moved to divide resistor 147 in a 4:1 ratio. This means that a greater portion of the rectifier 145 output voltage is being compared against an unchanged portion of rectifier 150 output voltage. This situation results in a positive output voltage between the tap 148 and the junction of resistors 152 and 153 for the same power condition that existed previously. The only difference is that the transistor switch now conducts to provide an output signal to the circuit breaker control and actuates the trip coil to open the breaker.

In this manner the system can be set up to trip the circuit breaker at varying levels of forward or reverse power flow to accommodate different network operating characteristics.

As was described in the foregoing description of this embodiment of my invention, two output signals are developed which may be used to actuate the circuit breaker controls to either trip the circuit breaker or to close the circuit breaker. The extreme versatility of adjustment of the phase sensitive portion of the circuit and the power sensing portion of the circuit allow a circuit breaker control to be applied to a circuit breaker which permits operation of the circuit breaker to facilitate remote switching of the circuit breaker as well as preventing closure of the circuit breaker under false conditions which would result in abnormally high currents.

While but a single embodiment of my invention has been described, other modifications will be obvious to one skilled in the art. Therefore, my invention is not to be restricted except as required by the appended claims when interpreted in view of the prior art relating thereto.

Having now particularly described and ascertained the nature of my said invention and the manner in which it is to be performed, I declare that what I claim is:

1. In combination with a circuit breaker connecting two alternating current systems, static control means for said circuit breaker comprising, means for producing a first output voltage over a first predetermined range of vector relationships between the voltages of said systems, means for producing a second output voltage over a second predetermined range of vector relationships between the voltages of said systems, means for producing a third output voltage responsive in polarity to a predetermined lead or lag of the current through said circuit breaker relative to the voltage of one of said systems, circuit breaker closure means in said control means, means responsive to said first and second output voltages to render said closure means inoperative, trip means in said control means, means connecting said trip means to be responsive to said third output voltage.

2. In combination with a circuit breaker connecting two alternating current systems having first and second alternating voltages respectively, static control means for said circuit breaker comprising, means for producing a first output voltage responsive in phase to the difference between said first and second alternating voltages, means for producing a second output voltage responsive in phase to said second alternating voltage, means for producing a third output voltage responsive in phase to the system current, means for producing a fourth output voltage responsive to, but shifted in phase from, said first output voltage, means for producing a first direct current signal voltage responsive to the arithmetic difference between first and second resultant voltages, said first resultant being responsive to the peak value of the vector sum of said second output and said third output voltage, said second resultant being responsive to the peak value of the vector difference between said second output voltage and said third output voltage, means for producing a second direct current signal voltage responsive to the arithmetic difference between third and fourth resultant voltages, said third resultant being responsive to the vector sum of said first output voltage and said second output voltage, said fourth resultant being responsive to the peak value of the vector difference between said first output voltage and said second output voltage, means for producing a third direct current signal voltage responsive to the arithmetic difference between fifth and sixth resultant voltages, said fifth resultant being responsive to the peak value of the vector sum of said second output voltage and said fourth output voltage, said sixth resultant being responsive to the peak value of the vector difference between said second output voltage and said fourth output voltage, said control means being responsive to said first signal voltage to trip said circuit breaker and to said second and third signal voltages to prevent closure of said circuit breaker.

3. In combination with a circuit breaker connecting two alternating current systems, static control means for said circuit breaker comprising, first voltage sensing means for deriving a first output voltage responsive to the voltage of said first system, second voltage sensing means for deriving a second output voltage responsive to the voltage of said second system, current sensing means for deriving a third output voltage responsive to the current of said second system, means for combining said second and third output voltages according to their vector sum and vector difference to produce a first signal voltage responsive to the difference between said second and third output voltages so combined, means connected to said first voltage sensing means and to said second voltage sensing means for producing a phasing voltage responsive to the difference between the voltages of said systems, phase shift means energized by said phasing voltage for shifting the phase of said phasing voltage, means for combining said phasing voltage and said second output voltage according to their vector sum and vector difference to produce a second signal voltage responsive to the difference between said phasing and second output voltages so combined, means for combining said phase shifted phasing voltage and said second output voltage according to their vector sum and vector difference to produce a third signal voltage responsive to the difference between said phase shifted phasing voltage and said second output voltage so combined, circuit breaker control means responsive to said first, second and third signal voltages to trip said breaker at a predetermined reverse power flow and to prevent closure of said circuit breaker when the voltage phase angle across the circuit breaker exceeds predetermined limits.

4. In combination with a circuit breaker connecting a transformer to a line, static control means for said circuit breaker comprising, first voltage sensing means for deriving a first output voltage responsive to the voltage on the transformer side of said circuit breaker, second voltage sensing means for deriving a second output voltage responsive in phase to the voltage on the line side of said circuit breaker, current sensing means for deriving a third output voltage responsive in phase to the current through said circuit breaker, means connected to said voltage sensing means for deriving a phasing voltage responsive to the voltage across said circuit breaker, means for shifting the phase of said phasing voltage, means for combining said second output voltage and third output voltages to produce a first D.C. signal voltage responsive to the peak value of the differential of their vector sum and vector difference, means for combining said second output voltage and said phasing voltage to produce a second D.C. signal voltage responsive to the peak value of the differential of their vector sum and vector difference, means for combining said phase shifted phasing voltage and said second output voltages to produce a third D.C. signal voltage responsive to the peak value of the differential of their vector sum and vector difference, trip means responsive to said first signal voltage to open said circuit breaker at a predetermined value of reverse power flow through said breaker, closing means for said circuit breaker responsive to said second and third signal voltage to prevent closure of said circuit breaker when the relationship between the voltages on opposite sides of said breaker falls outside a predetermined range of phase and magnitude.

References Cited in the file of this patent
UNITED STATES PATENTS

| | | |
|---|---|---|
| 1,727,989 | Kennedy | Sept. 10, 1929 |
| 2,529,723 | Chevallier | Nov. 14, 1950 |
| 2,817,024 | Karlicek | Dec. 17, 1957 |
| 2,900,528 | Baude | Aug. 18, 1959 |